H. G. BEEDE & E. C. WILLIAMS.
CLUTCH.
APPLICATION FILED APR. 7, 1909.
999,088.
Patented July 25, 1911.
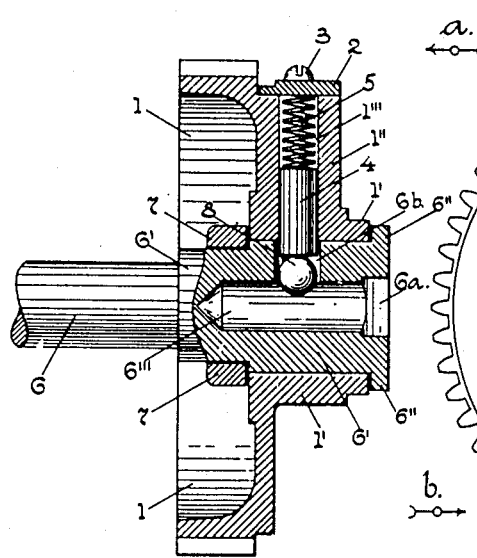
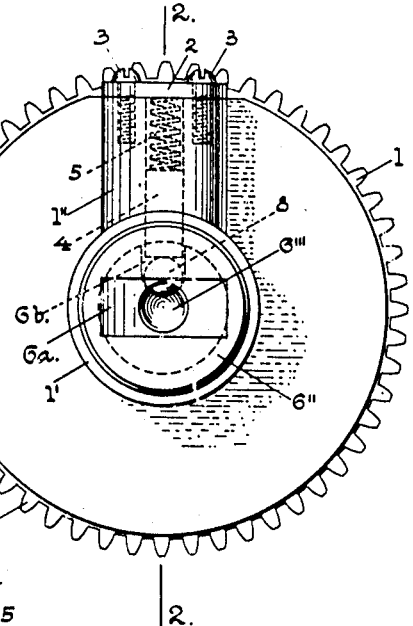
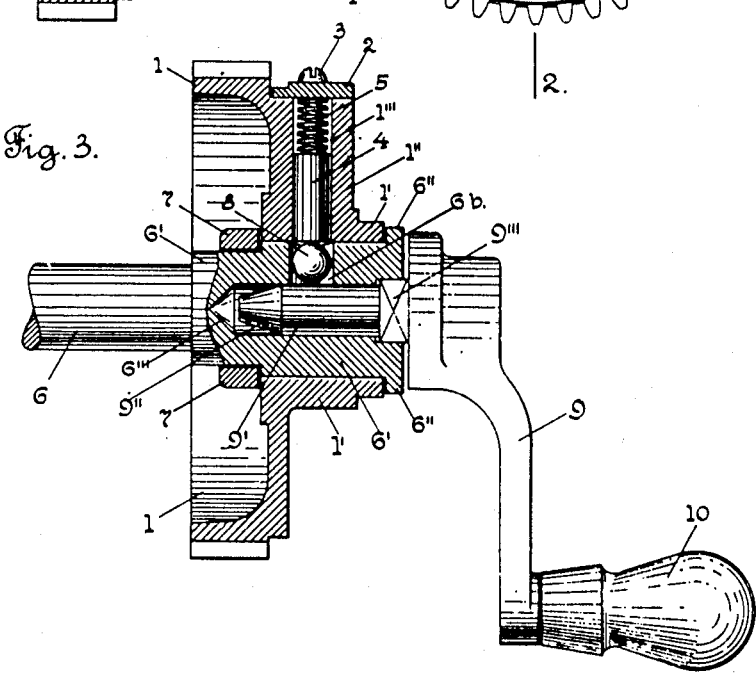

UNITED STATES PATENT OFFICE.

HERBERT G. BEEDE AND EUGENE C. WILLIAMS, OF PAWTUCKET, RHODE ISLAND.

CLUTCH.

999,088.          Specification of Letters Patent.      Patented July 25, 1911.

Application filed April 7, 1909. Serial No. 488,450.

*To all whom it may concern:*

Be it known that we, HERBERT G. BEEDE and EUGENE C. WILLIAMS, citizens of the United States, residing at Pawtucket, in the county of Providence and State of Rhode Island, have jointly invented certain new and useful Improvements in Clutches, of which the following is a specification.

Our invention relates to a clutch, or clutch mechanism, for clutching and unclutching two parts or members, one or both of which may be rotary, so that one part or member will be rotated by the other, or one part or member may be rotated independently of the other.

Our invention consists in certain novel features of construction of our improvements as will be hereinafter fully described.

In our improved clutch, or clutch mechanism, we combine with one part or member, a movable piece, which is preferably in the form of a pin or stud, and which is preferably spring-actuated, and is adapted to enter an opening in the other part or member, to attach said two members together, and to cause one member to be rotated by the other member. We combine with the second part or member, which has a longitudinally extending opening therein within the periphery thereof, and one or more transverse openings leading into said longitudinally extending opening, a ball or spacing block, which is of the same diameter or thickness as the wall through which the transverse opening extends; said ball or spacing block is retained within the transverse opening by the inner end of the transverse opening being of less diameter than the diameter of the ball or spacing block. The ball or spacing block is adapted to be moved outwardly in the transverse opening, to cause the inner end of the movable piece or clutch pin to be moved out of said opening, and leave the two parts or members unclutched.

In the present embodiment of our improvements, as shown and described herein, one of the parts or members is shown as a gear which carries the spring actuated clutch pin, and the other part or member is shown as a shaft or rod, on which said gear is loosely mounted and which has one or more transverse openings therein, to receive the clutch pin. The shaft may be a driven shaft, and the gear a driving gear, or vice versa.

Referring to the drawings:—Figure 1 is an end view of a gear, and shaft or rod embodying our improvements, with the unclutching and turning handle shown in Fig. 3 removed, and looking in the direction of arrow $a$, Fig. 2. Fig. 2 is a central vertical section, on line 2, 2, Fig. 1, looking in the direction of arrow $b$, same figure, showing the two members clutched together, and Fig. 3 corresponds to Fig. 2, but shows the members unclutched, and the handle for unclutching, and for rotating one member independently of the other, in position.

In the accompanying drawing, 1 is a gear, in this instance shown as cored out on one side and having the hub portion 1', and a boss or extension 1'' extending from one side of the hub. The boss or projection 1'' has in this instance a central opening 1''' therethrough, extending from the outer end of the boss through one side of the hub, as shown in Figs. 2 and 3.

A removable cap 2 is secured upon the outer end of the boss 1'', in this instance by two screws 3, extending loosely through holes in said cap and turning into threaded holes in the boss 1''; in this instance there is one hole on each side of the central opening 1'''. The screws 3 detachably secure the cap 2 to the outer end of the boss 1''.

Extending loosely within the hole 1''' is in this instance a pin 4, preferably of cylindrical shape, which has a longitudinal movement in said hole 1'''. A helically coiled expansion spring 5 extends in this instance within the hole 1''', and is compressed between the outer end of the pin 4 and the underside of the cap 2.

In connection with the gear 1 is shown, in this instance a shaft or rod 6, having in this instance the enlarged end 6' on which is loosely mounted the hub 1' of the gear 1. The enlarged end 6' has, in this instance, the annular outwardly extending lip or flange 6'' thereon, which, with a collar 7, fast on the shaft 6, in this instance prevents any longitudinal movement of the gear 1 on the shaft 6. The enlarged end 6' of the shaft 6 has in this instance a central axial opening 6''' therein, in the direction of the length of the shaft. The outer end of the enlarged part 6' has in this instance a transverse recessed part 6ª, see Figs. 1 and 2, into which the central opening 6''' leads. A transverse opening 6ᵇ leads out, in this instance, from one side of the central opening 6''' through the enlarged end 6'', forming an opening from the outer surface of said end into the central opening 6'''. The opening 6ᵇ is preferably of cylindrical shape, and of a little larger diameter than the opening 1''' in the boss 1'', and in same vertical plane therewith. The opening 6ᵇ at its inner end is of reduced diameter. A ball 8 in this instance or spacing block fits loosely in the opening 6ᵇ, in the enlarged part 6' of the shaft 6, and the diameter of the ball 8 corresponds to the length of the opening 6ᵇ, the diameter of the opening 6ᵇ at its inner end is a little less than the diameter of the ball 8, so that the ball is prevented from passing out of said opening, and at the same time the ball is held at the inner end of said opening, and limits the inward movement of the spring-actuated pin 4, as shown in Fig. 2. The ball 8, or spacing block, acts to fill up the transverse opening in the enlarged end 6' of the shaft 6, between the outer surface of said enlarged end and the central opening 6''' therein, when the pin 9' on the handle 9 is inserted into said opening 6''', as shown in Fig. 3, and thus hold the pin 4 in its outward position, and leave the gear 1 free to turn on the enlarged end 6' of the shaft 6, or vice versa.

We have shown in this instance a handle 9 having a turning knob 10 on the outer end thereof, for engaging and moving the ball 8 outwardly, and for rotating in this instance the shaft 6, independently of the gear 1. The handle 9 has a pin 9' thereon with a beveled or cone-shaped inner end 9'', and an enlarged, in this instance, square-shouldered part 9'''. The pin 9' on the handle 9 is adapted to fit loosely into the opening 6''' in the enlarged end 6' of the shaft 6, and the square-shouldered part 9''' extends into the transverse recess 6ᵃ in the outer end of the enlarged end 6' of the shaft 6, to cause the shaft 6 to turn with the handle 9, through the engagement of the square-shouldered part 9''' with the transverse recess 6ᵃ.

The operation of our improvements will be readily understood by those skilled in the art. The ball 8 is first placed in the opening 6ᵇ, from the outer end of said opening, before the hub of the gear 1 is placed on the shaft 6, and when it is desired to have the gear and shaft rotate in unison, the gear 1 or the shaft 6 is turned until the pin 4 is in alinement with the opening 6''' in the enlarged end 6' of the shaft 6. The pin 4 will then be automatically moved by the spring 5, to carry its inner end into the opening 6ᵇ in the end 6', as shown in Figs. 1, and 2, to attach the gear 1 to the shaft 6. The ball 8 moves to the inner end of the opening 6ᵇ and is retained there by the reduced size of said opening at its inner end, as shown in Figs. 1, and 2. The rotation of either the gear 1, or the shaft 6, will then cause the rotation of the other part. When it is desired to unclutch or disconnect the gear 1 and the shaft 6, so that either one may be turned independently of the other, then the pin 9' on the handle 9 is inserted into the central opening 6''' in the enlarged end 6' of the shaft 6, and the engagement of the pin 9' with the ball 8 will move outwardly said ball, and through said ball move outwardly the pin 4, until its outer end is moved out of the opening 6ᵇ in the head 6', the ball 8 being of a diameter corresponding to the length of the opening 6ᵇ, or the distance from the periphery of the pin 9' to the outer edge of the end 6', as shown in Fig. 3. The pin 9' is inserted into the central opening 6''' until the square-shaped part 9''' enters into the transverse groove or recess 6ᵃ at the outer end of the end 6'. Through the knob 10 on the handle 9, the handle is turned, and with it the shaft 6 inside of the gear 1, or the gear 1 may be rotated on the shaft 6.

In our improved clutch mechanism, the clutch pin is carried on the gear or rotary member, which rotates upon the shaft 6, or other rotary member, and the longitudinal opening to receive the device for moving the clutch pin out of clutch, is located within the outer surface or periphery of the shaft 6, or the inner rotary member, and therefore in order to disengage the clutch pin to unclutch the rotary members, there must be a spacing block or intermediate device between the inner end of the clutch pin, and the device inserted into the longitudinal opening in the shaft, to move the clutch pin out of clutch, and allow either of the two members to rotate independently.

It will be understood that the details of construction of our improvements may be varied if desired, and they may be adapted to be used on different classes of machines in which it is desired to clutch two parts together, or to unclutch them, so that one part may be moved independently of the other. Instead of a ball 8, any suitable device as a half ball, or a pin with a rounded end may be used.

We have shown in the drawing and described herein, a removable handle 9, with a pin 9' thereon, as a device or means for moving the ball 8 outwardly, to move outwardly the pin 4 to unclutch the gear 1 from the shaft or rod 6, and turn the shaft or rod 6 independently of the gear 1, but instead of a removable handle 9, any suitable device or means may be used, and said means may be permanently attached to the shaft or rod 6, and adapted to rotate or turn therewith, and be moved out or in, to cause the gear 1 to be clutched to, or unclutched from the shaft or rod 6, and turn said shaft or rod 6 independently of said gear.

We have shown in the drawing only one ball 8, but two or more balls or devices, held in openings corresponding to the opening 6^b around the end 6^b', may be used if desired, so that it will require only a partial rotation of the gear 1, or the shaft 6, to bring the opening 1''' in the boss 1'', in alinement with an opening 6^b in the end 6' of the shaft 6.

Having thus described our invention, what we claim as new and desire to secure by Letters Patent is:

1. The combination with two rotary members, and means for clutching and unclutching said members, said means comprising a spring-pressed movable piece carried by one member, and the other member having a longitudinal opening within its periphery, and a transverse opening leading into said longitudinal opening, to receive said movable piece, and a spacing device in said transverse opening, intermediate said movable piece and said longitudinal opening, to move inwardly and allow said movable piece to move into said transverse opening, to clutch said members, and means to move outwardly said spacing device to unclutch said members.

2. The combination with two rotary members, of means for clutching and unclutching said members, said means comprising a spring-pressed movable piece carried by one member, and the other member having a longitudinal opening within its periphery, and a transverse opening leading into said longitudinal opening, and a spacing device in said transverse opening, intermediate said movable piece and said longitudinal opening, to move inwardly, and allow said movable piece to move into said transverse opening, to clutch said members, and means to move outwardly said spacing device to unclutch said members.

3. The combination with two rotary members, and means for clutching and unclutching said members, said means comprising a spring-actuated pin carried by one member, and the other member having a longitudinal opening therein within its periphery, and a transverse opening leading into said longitudinal opening, and a spacing device in said transverse opening, intermediate said spring actuated pin and said longitudinal opening, to move inwardly and allow said spring actuated pin to move into said transverse opening to clutch said members, and means to move outwardly said spacing device to unclutch said members.

4. The combination with two rotary members, and means for clutching and unclutching said members, said means comprising a spring actuated pin carried by the outer member, and the inner member having a longitudinal opening therein, within its periphery, and a transverse opening leading into said longitudinal opening, and a spacing device in said transverse opening to move inwardly and allow said spring actuated pin to move into said transverse opening to clutch said members, and said spacing device adapted to be moved outwardly to unclutch said members, and a device to be inserted into the longitudinal opening to engage and move outwardly said spacing device, and with it said spring actuated pin, to render said spring actuated pin inoperative.

5. In combination, a gear mounted on a shaft, and a spring actuated pin carried on said gear, and having a movement in the direction of its length, said shaft, having a longitudinal opening therein within its periphery, and a transverse opening leading into said longitudinal opening for the entrance of said pin, and a spacing piece retained in said transverse opening, intermediate said pin and said longitudinal opening, and a movable pin to be inserted into said longitudinal opening, to engage said spacing piece, and through said spacing piece to move said pin to unclutch the gear from the shaft.

6. The combination with two members, one mounted on the other, of means for clutching and unclutching said members, said means comprising a spring actuated pin carried by the member mounted on the other member, and said last mentioned member having a longitudinal opening therein, within its periphery, and a transverse opening leading into said longitudinal opening, to receive the clutch pin, and a spacing piece in said transverse opening, intermediate the clutch pin and said longitudinal opening, and means to move said spacing piece to unclutch the members.

7. The combination with two members, one mounted on the other, of means for clutching and unclutching said members, said means comprising a spring actuated pin carried by the member mounted on the other member, and said last mentioned member having a longitudinal opening therein, within its periphery, and a transverse opening of reduced diameter at its inner end, leading into said longitudinal opening, to receive the clutch pin, and a spacing piece in said transverse opening, intermediate the clutch pin and said longitudinal opening, and means to move said spacing piece to unclutch the members.

8. In combination, a rotary gear having a boss or projection thereon, and a central opening therethrough, and a longitudinally moving pin within said opening, and a helically coiled expansion spring to actuate said pin in one direction, said gear mounted on a shaft said shaft having a longitudinal opening in its end, within its periphery, and a transverse opening leading from said longitudinal opening to the outer surface of said shaft, said transverse opening adapted to receive said longitudinally moving pin to clutch the members, and a spacing piece within said transverse opening, intermediate the inner end of said pin and said longitudinal opening, and a device for entering said longitudinal opening and engaging said spacing device, to cause it to move said pin out of the transverse opening in said shaft, to unclutch the members.

HERBERT G. BEEDE.
EUGENE C. WILLIAMS.

Witnesses:
HERBERT J. SUTTON,
ROBERT B. CARTER.